US012736916B2

(12) United States Patent
Lei et al.

(10) Patent No.: US 12,736,916 B2

(45) Date of Patent: Sep. 15, 2026

(54) PHASE CHANGE MATERIAL-BASED METASURFACE STRUCTURE AND RELATED METHOD

(71) Applicant: City University of Hong Kong, Kowloon (HK)

(72) Inventors: Dangyuan Lei, Hong Kong (HK); Yulong Fan, Hong Kong (CN); Yuan Liao, Hong Kong (CN)

(73) Assignee: City University of Hong Kong, Kowloon (HK)

( * ) Notice: Subject to any disclaimer, the term of this patent is extended or adjusted under 35 U.S.C. 154(b) by 222 days.

(21) Appl. No.: 18/543,000

(22) Filed: Dec. 18, 2023

(65) Prior Publication Data

US 2025/0199472 A1 Jun. 19, 2025

(51) Int. Cl.

*G03H 1/26* (2006.01)
*G02B 1/00* (2006.01)
*G03H 1/02* (2006.01)

(52) U.S. Cl.

CPC ........... *G03H 1/2645* (2013.01); *G02B 1/002* (2013.01); *G03H 1/024* (2013.01); *G03H 2001/2625* (2013.01); *G03H 2001/2675* (2013.01); *G03H 2240/11* (2013.01); *G03H 2240/26* (2013.01)

(58) Field of Classification Search

None

See application file for complete search history.

(56) References Cited

U.S. PATENT DOCUMENTS

2023/0027067 A1* 1/2023 Liu .......................... G02F 1/292
2023/0185237 A1* 6/2023 Yang ........................ G03H 1/02
359/11
2023/0400811 A1* 12/2023 Moon .................. G03H 1/2645
2024/0061376 A1* 2/2024 Rho ....................... G02B 1/002

FOREIGN PATENT DOCUMENTS

KR 20230023237 A * 2/2023 ............... G02B 1/02

OTHER PUBLICATIONS

Wang, Qian, et al. "Optically reconfigurable metasurfaces and photonic devices based on phase change materials." Nature photonics 10.1 (2016): 60-65.

Lee, Seung-Yeol, et al. "Holographic image generation with a thin-film resonance caused by chalcogenide phase-change material." Scientific reports 7.1 (2017): 41152.

Choi, Chulsoo, et al. "Hybrid state engineering of phase-change metasurface for all-optical cryptography." Advanced Functional Materials 31.4 (2021): 2007210.

(Continued)

*Primary Examiner* — Jyotsna V Dabbi

(74) *Attorney, Agent, or Firm* — Renner, Kenner, Greive, Bobak, Taylor & Weber

(57) ABSTRACT

A metasurface structure including an array of sub-wavelength structures including a phase change material (PCM), encoded with different holographic images based on different phases of the PCM, the different phases including a first phase and a second phase. Phase transition between the first phase and the second phase occurs when the metasurface structure is thermally tuned. Each sub-wavelength structure in the array has a distinctive phase difference between the first phase and the second phase of the PCM.

23 Claims, 8 Drawing Sheets

(56) References Cited

OTHER PUBLICATIONS

Liu, Xingbo, et al. "Thermally dependent dynamic meta-holography using a vanadium dioxide integrated metasurface." Advanced Optical Materials 7.12 (2019): 1900175.
D. Pi, J. Liu, and Y. Wang, "Review of computer-generated hologram algorithms for color dynamic holographic three-dimensional display," Light Sci Appl, vol. 11, No. 1, pp. 231, Jul. 26, 2022.
T. Shimobaba, D. Blinder, T. Birnbaum, I. Hoshi, H. Shiomi, P. Schelkens, and T. Ito, "Deep-Learning Computational Holography: A Review," Frontiers in Photonics, vol. 3, 2022.
R. W. Gerchberg, "A practical algorithm for the determination of plane from image and diffraction pictures," Optik, vol. 35, No. 2, pp. 237-246, 1972.
M. Makowski, "Three-plane phase-only computer hologram generated with iterative Fresnel algorithm," Optical Engineering, vol. 44, No. 12, 2005.
T. Zhao, and Y. Chi, "Modified Gerchberg-Saxton (G-S) Algorithm and Its Application," Entropy (Basel), vol. 22, No. 12, Nov. 30, 2020.
Z. Jin, S. Mei, S. Chen, Y. Li, C. Zhang, Y. He, X. Yu, C. Yu, J. K. W. Yang, B. Luk'yanchuk, S. Xiao, and C. W. Qiu, "Complex Inverse Design of Meta-optics by Segmented Hierarchical Evolutionary Algorithm," ACS Nano, vol. 13, No. 1, pp. 821-829, Jan. 22, 2019.
H. Goi, K. Komuro, and T. Nomura, "Deep-learning-based binary hologram," Appl Opt, vol. 59, No. 23, pp. 7103-7108, Aug. 10, 2020.
D. Liao, M. Wang, K. F. Chan, C. H. Chan, and H. Wang, "A Deep-Learning Enabled Discrete Dielectric Lens Antenna for Terahertz Reconfigurable Holographic Imaging," IEEE Antennas and Wireless Propagation Letters, vol. 21, No. 4, pp. 823-827, 2022.
H. Zhou, X. Li, H. Wang, S. Zhang, Z. Su, Q. Jiang, N. Ullah, X. Li, Y. Wang, and L. Huang, "Ultra-dense moving cascaded metasurface holography by using a physics-driven neural network," Opt Express, vol. 30, No. 14, pp. 24285-24294, Jul. 4, 2022.
N. Yu, P. Genevet, M. A. Kats, F. Aieta, J. P. Tetienne, F. Capasso, and Z. Gaburro, "Light propagation with phase discontinuities: generalized laws of reflection and refraction," Science, vol. 334, No. 6054, pp. 333-337, Oct. 21, 2011.
D. Lin, P. Fan, E. Hasman, and M. L. Brongersma, "Dielectric gradient metasurface optical elements," Science, vol. 345, No. 6194, pp. 298-302, Jul. 18, 2014.
M. Khorasaninejad, W. T. Chen, R. C. Devlin, J. Oh, A. Y. Zhu, and F. Capasso, "Metalenses at visible wavelengths: Diffraction-limited focusing and subwavelength resolution imaging," Science, vol. 352, No. 6290, pp. 1190-1194, Jun. 3, 2016.
X. Ni, A. V. Kildishev, and V. M. Shalaev, "Metasurface holograms for visible light," Nature Communications, vol. 4, No. 1, 2013.
L. Huang, X. Chen, H. Mühlenbernd, H. Zhang, S. Chen, B. Bai, Q. Tan, G. Jin, K.-W. Cheah, C.-W. Qiu, J. Li, T. Zentgraf, and S. Zhang, "Three-dimensional optical holography using a plasmonic metasurface," Nature Communications, vol. 4, No. 1, 2013.
D. Wen, F. Yue, G. Li, G. Zheng, K. Chan, S. Chen, M. Chen, K. F. Li, P. W. Wong, K. W. Cheah, E. Y. Pun, S. Zhang, and X. Chen, "Helicity multiplexed broadband metasurface holograms," Nat Commun, vol. 6, pp. 8241, Sep. 10, 2015.
B. Wang, F. Dong, Q. T. Li, D. Yang, C. Sun, J. Chen, Z. Song, L. Xu, W. Chu, Y. F. Xiao, Q. Gong, and Y. Li, "Visible-Frequency Dielectric Metasurfaces for Multiwavelength Achromatic and Highly Dispersive Holograms," Nano Lett, vol. 16, No. 8, pp. 5235-5240, Aug. 10, 2016.
L. Huang, S. Zhang, and T. Zentgraf, "Metasurface holography: from fundamentals to applications," Nanophotonics, vol. 7, No. 6, pp. 1169-1190, 2018.
R. Zhao, L. Huang, and Y. Wang, "Recent advances in multi-dimensional metasurfaces holographic technologies," PhotoniX, vol. 1, No. 1, 2020.
H. S. Ee, and R. Agarwal, "Tunable Metasurface and Flat Optical Zoom Lens on a Stretchable Substrate," Nano Lett, vol. 16, No. 4, pp. 2818-2823, Apr. 13, 2016.
P. Gutruf, C. Zou, W. Withayachumnankul, M. Bhaskaran, S. Sriram, and C. Fumeaux, "Mechanically Tunable Dielectric Resonator Metasurfaces at Visible Frequencies," ACS Nano, vol. 10, No. 1, pp. 133-141, Jan. 26, 2016.
S. C. Malek, H. S. Ee, and R. Agarwal, "Strain Multiplexed Metasurface Holograms on a Stretchable Substrate," Nano Lett, vol. 17, No. 6, pp. 3641-3645, Jun. 14, 2017.
J. Li, S. Kamin, G. Zheng, F. Neubrech, S. Zhang, and N. Liu, "Addressable metasurfaces for dynamic holography and optical information encryption," Sci Adv, vol. 4, No. 6, pp. eaar6768, Jun. 2018.
L. Li, T. Jun Cui, W. Ji, S. Liu, J. Ding, X. Wan, Y. Bo Li, M. Jiang, C. W. Qiu, and S. Zhang, "Electromagnetic reprogrammable coding-metasurface holograms," Nat Commun, vol. 8, No. 1, pp. 197, Aug. 4, 2017.
R. Feng, B. Ratni, J. Yi, K. Zhang, X. Ding, H. Zhang, A. de Lustrac, and S. N. Burokur, "Versatile Airy-Beam Generation Using a 1-Bit Coding Programmable Reflective Metasurface," Physical Review Applied, vol. 14, No. 1, 2020.
R. Feng, B. Ratni, J. Yi, H. Zhang, A. de Lustrac, and S. N. Burokur, "Versatile metasurface platform for electromagnetic wave tailoring," Photonics Research, vol. 9, No. 9, 2021.
G.-B. Wu, J. Y. Dai, Q. Cheng, T. J. Cui, and C. H. Chan, "Sideband-free space-time-coding metasurface antennas," Nature Electronics, vol. 5, No. 11, pp. 808-819, 2022.
I. Kim, J. Jang, G. Kim, J. Lee, T. Badloe, J. Mun, and J. Rho, "Pixelated bifunctional metasurface-driven dynamic vectorial holographic color prints for photonic security platform," Nat Commun, vol. 12, No. 1, pp. 3614, Jun. 14, 2021.
Q. Wang, E. T. F. Rogers, B. Gholipour, C.-M. Wang, G. Yuan, J. Teng, and N. I. Zheludev, "Optically reconfigurable metasurfaces and photonic devices based on phase change materials," Nature Photonics, vol. 10, No. 1, pp. 60-65, 2015.
X. Liu, Q. Wang, X. Zhang, H. Li, Q. Xu, Y. Xu, X. Chen, S. Li, M. Liu, Z. Tian, C. Zhang, C. Zou, J. Han, and W. Zhang, "Thermally Dependent Dynamic Meta-Holography Using a Vanadium Dioxide Integrated Metasurface," Advanced Optical Materials, vol. 7, No. 12, 2019.
C. Choi, S. E. Mun, J. Sung, K. Choi, S. Y. Lee, and B. Lee, "Hybrid State Engineering of Phase-Change Metasurface for All-Optical Cryptography," Advanced Functional Materials, vol. 31, No. 4, 2020.
F. Zhang, X. Xie, M. Pu, Y. Guo, X. Ma, X. Li, J. Luo, Q. He, H. Yu, and X. Luo, "Multistate Switching of Photonic Angular Momentum Coupling in Phase-Change Metadevices," Adv Mater, vol. 32, No. 39, pp. e1908194, Oct. 2020.
C. Wu, H. Yu, S. Lee, R. Peng, I. Takeuchi, and M. Li, "Programmable phase-change metasurfaces on waveguides for multimode photonic convolutional neural network," Nat Commun, vol. 12, No. 1, pp. 96, Jan. 4, 2021.
P. Kepič, F. Ligmajer, M. Hrtoň, H. Ren, L. d. S. Menezes, S. A. Maier, and T. Šikola, "Optically Tunable Mie Resonance VO2 Nanoantennas for Metasurfaces in the Visible," ACS Photonics, vol. 8, No. 4, pp. 1048-1057, 2021.
F. Z. Shu, F. F. Yu, R. W. Peng, Y. Y. Zhu, B. Xiong, R. H. Fan, Z. H. Wang, Y. Liu, and M. Wang, "Dynamic Plasmonic Color Generation Based on Phase Transition of Vanadium Dioxide," Advanced Optical Materials, vol. 6, No. 7, 2018.
Z.-Y. Jia, F.-Z. Shu, Y.-J. Gao, F. Cheng, R.-W. Peng, R.-H. Fan, Y. Liu, and M. Wang, "Dynamically Switching the Polarization State of Light Based on the Phase Transition of Vanadium Dioxide," Physical Review Applied, vol. 9, No. 3, 2018.
F. Z. Shu, J. N. Wang, R. W. Peng, B. Xiong, R. H. Fan, Y. J. Gao, Y. Liu, D. X. Qi, and M. Wang, "Electrically Driven Tunable Broadband Polarization States via Active Metasurfaces Based on Joule-Heat-Induced Phase Transition of Vanadium Dioxide," Laser & Photonics Reviews, vol. 15, No. 10, 2021.

(56) References Cited

OTHER PUBLICATIONS

J. N. Wang, B. Xiong, R. W. Peng, C. Y. Li, B. Q. Hou, C. W. Chen, Y. Liu, and M. Wang, “Flexible Phase Change Materials for Electrically-Tuned Active Absorbers,” Small, vol. 17, No. 31, pp. e2101282, Aug. 2021.
M. Kang, T. Feng, H. T. Wang, and J. Li, “Wave front engineering from an array of thin aperture antennas,” Opt Express, vol. 20, No. 14, pp. 15882-15890, Jul. 2, 2012.
D. P. Kingma, and J. Ba, “Adam: A method for stochastic optimization,” arXiv preprint arXiv:1412.6980, 2014.

* cited by examiner b a b a b a $u_0$ $\left|F^{-1}\left\{F\left\{u_0\right\} \times H\left(f_x, f_y\right)\right\}\right|^2$ Input Layer Hidden Layer Output Layer a
b
c
d
e
f
g
h
i
j
RT
HT
CityU
0
π
0
0.7π
π
1.7π
-0.7π
0
0.3π
π
d = 1.2 mm
d = 0.8 mm
d = 1.2 mm
d = 0.8 mm
Max
Min

PHASE CHANGE MATERIAL-BASED METASURFACE STRUCTURE AND RELATED METHOD

TECHNICAL FIELD

The present invention relates to metasurface structures and methods for encoding information on the metasurface structures. In particular, the present invention relates to phase change material (PCM)-based metasurface structures and methods for encoding information on the PCM-based metasurface structures.

BACKGROUND

Holography is a powerful technique capable of recording and reconstructing the amplitude and phase of light fields by using interference and diffraction [1]. The popularly adopted computational holography digitally calculates holograms (recorded interference patterns) from predefined images by solving the inverse design problem instead of using optical systems [2, 3]. The Gerchberg-Saxton (GS) algorithm, as a widely used phase retrieval algorithm for hologram calculation, has the advantages of simplicity and fast convergence whereas suffers from limited image quality, stagnating in local optima, and inconsistency in output [4-6]. Alternatively, machine learning-based holography has been recently developed for both enhancements in image quality and computing speed, especially when designing holograms for three-dimensional (3D) display [2], binary-amplitude holograms [7, 8], multilayer holograms [9, 10], etc.

As the broadly used spatial light modulator (SLM) based holography suffers from modulation errors, high-order diffractions, and narrow viewing angles [2], optical metasurfaces are a promising alternative candidate for solving the above problems [11-13]. By encoding computer-generated holograms into sub-wavelength nano-blocks, metasurface holography is capable of generating high-quality and large-viewing-angle holographic images without unwanted diffraction orders [14-19]. Typically, metasurfaces are static devices with predefined fixed functionalities. Recently, tunable metasurfaces have been achieved with the aid of stretchable substrates [20-22], chemical treatment [23], electric diodes [24-27], liquid crystals [28], and phase-change materials (PCMs) [29-33]. However, most of the PCM-based optical metasurfaces work in the infrared band by leveraging different optical behaviors originating from plasmonic resonance, and the ones working in the visible are rarely reported.

SUMMARY OF THE INVENTION

Metasurface holography has aroused immense interest in producing computational holographic images with high quality, higher-order diffraction-free, and large viewing angles by using a planar artificial sheet consisting of flexible sub-wavelength nanostructures, i.e., metasurface. However, dynamically tunable metasurface holography in the visible has rarely been reported due to limited available tuning methods. Some embodiments of the invention propose and theoretically demonstrate a thermally tunable phase change material (for example, vanadium dioxide ($VO_2$)) based binary-phase metasurface generating different holographic information in the visible at different temperatures. Two independent binary-phase distributions, corresponding to two independent holograms revealed in different phases of the phase change material (for example, $VO_2$ states), are optimized by training machine learning models with two targeted images. By elaborately choosing the dimensions and rotations of the sub-wavelength nano-blocks, high-quality reconstructed images can be obtained under proper incident excitations. The embodiments of the invention offer a new and general way of dynamic metasurface design, which can be used in dynamic display, information encryption, optical anti-counterfeiting, etc.

In a first aspect of the invention, there is provided a metasurface structure including an array of sub-wavelength structures including a phase change material (PCM), encoded with different holographic images based on different phases of the PCM, the different phases including a first phase and a second phase. Phase transition between the first phase and the second phase occurs when the metasurface structure is thermally tuned. Each sub-wavelength structure in the array has a distinctive phase difference between the first phase and the second phase of the PCM.

In some embodiments, the different holographic images may include a first holographic image displayed in the first phase and a second holographic image displayed in the second phase.

In some embodiments, the phase change material may include vanadium dioxide ($VO_2$).

In some embodiments, the metasurface structure may be optically excited by visible radiation.

In some embodiments, the visible radiation may have a wavelength which ranges between 600 nm to 800 nm.

In some embodiments, the array of sub-wavelength structures may include a plurality of sub-wavelength micro-structures or nano-structures.

In some embodiments, the array of sub-wavelength structures may be in the form of nano-blocks having a height, a length and a width.

In some embodiments, dimensions and/or rotation states of the array of the nano-blocks may be optimized based on a meta-atom library.

In some embodiments, the array of the nano-blocks may include four types of nano-blocks which are selected to have distinctive phase differences between two phases of the PCM and high cross-polarized light transmittance.

In some embodiments, the four nano-blocks may be different in terms of at least one of their rotation states and dimensions.

In a second aspect of the invention, there is provided a method for encoding information on a metasurface structure including an array of sub-wavelength structures, including selecting the array of sub-wavelength structures including a phase change material (PCM) such that each sub-wavelength structure in the array has a distinctive phase difference between a first phase and a second phase of the PCM, and encoding at least two different holographic images into the array of sub-wavelength structures based on the first phase and the second phase of the PCM. The first phase and the second phase are different.

In some embodiments, selecting the array of sub-wavelength structures may include selecting dimensions and/or rotation states of respective sub-wavelength structures in the array.

In some embodiments, the method may further include constructing a meta-atom library to show cross-polarized light transmittance and phase shift at different temperatures as a function of dimensions of the array of sub-wavelength structures.

In some embodiments, selecting the array of sub-wavelength structures may include selecting, from the meta-atom library, four nano-blocks with distinctive phase differences and high cross-polarized light transmittance.

In some embodiments, the array of sub-wavelength structures may be in the form of nano-blocks having a height, a length and a width.

In some embodiments, selecting the array of sub-wavelength structures may include selecting all nano-blocks with cross-polarized light transmittance higher than an allowed minimum of transmittance $T_{min}$ and not exceeding an allowed maximum of transmittance $T_{max}$ at an arbitrary wavelength in the range of 600 nm to 800 nm, comparing every two nano-blocks selected from the previous selecting step, and finding pairs with phase differences between $-\Delta\varphi_{max}$ and $\Delta\varphi_{max}$ at a first temperature and $\pi-\Delta\varphi_{max}$ and $\pi+\Delta\varphi_{max}$ at a second temperature at one wavelength where $\Delta\varphi_{max}$ is an allowed maximum errors in phase differences, obtaining pairs of nano-blocks satisfying the state transitions of 0 to 0 and 0 to $\pi$, and exchanging the nano-block's length and width of the selected pair of nano-blocks to obtain another pair satisfying $\pi$ to $\pi$ and $\pi$ to 0 state transitions.

In some embodiments, the first temperature may be a room temperature (RT) and the second temperature may be a temperature higher than the room temperature (HT).

In some embodiments, encoding the at least two different holographic images may be based on a gradient descent-based iterative approach.

In some embodiments, the gradient descent-based iterative approach may be based on a machine learning model comprising three layers of an input layer, a hidden layer, and an output layer, corresponding to an incident light, a diffraction plane, and an image plane, respectively.

In some embodiments, encoding the at least two different holographic images based on the gradient descent-based iterative approach may include calculating two binary-phase holographic images based on the gradient descent-based iterative approach, and encoding the two holographic images into the two different phases of the PCM at two temperatures.

In some embodiments, encoding the at least two different holographic images may include applying additional work conditions including wavelength, polarization, and/or observation distance.

In some embodiments, different observation distances and/or different polarizations may be assigned for respective holographic images in addition to the different temperatures.

In some embodiments, the phase change material (PCM) may include vanadium dioxide ($VO_2$).

In some embodiments, the at least two different holographic images may be generated when the metasurface structure is optically excited by visible radiation.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree such that "generally", "about", "substantially", or the like, are used, depending on context, to account for manufacture tolerance, degradation, trend, tendency, imperfect practical condition(s), etc. In one example, when a value is modified by terms of degree, such as "about", such expression includes the stated value ±15%, ±10%, ±5%, ±2%, or ±1%.

Unless otherwise specified, the terms "connected", "coupled", "mounted" or the like, are intended to encompass both direct and indirect connection, coupling, mounting, etc.

BRIEF DESCRIPTION OF DRAWINGS

Embodiments of the invention will now be described, by way of example, with reference to the accompanying drawings, in which:

FIG. 2*a* shows example holographic images generated by the holographic metasurface when optically excited at room temperature (30° C.); and FIG. 2*b* shows example holographic images generated by the holographic metasurface when optically excited at high temperature (90° C.), respectively. The grayscales in FIGS. 2*a* and 2*b* indicate the phase profiles at different temperatures.

Before any embodiments of the invention are explained in detail, it is to be understood that the invention is not limited in its application to the details of embodiment and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

The embodiments of the invention are related to a tunable holographic metasurface based on phase change materials (PCMs). Specifically, the phase transition of PCMs leads to significant changes in their optical properties, allowing different holographic information to be encoded in different phases. Consequently, dynamically switching between different phases can provide dynamic images. On the other hand, the external conditions for phase transition and holographic display can be regarded as multiple “keys” for information encryption and decryption. The approach to the design of tunable holographic metasurfaces follows two steps: First, optimize four phase-changeable nano-blocks in morphology to fulfill the four optical phase shift transitions, i.e., 0 to 0, 0 to π, π to 0, and π to π; second, encode two independent binary-phase holograms into the phase profiles in two different phases of the material based on the optimized nano-blocks. Overall, the embodiments of the invention offer a general way of tunable metasurface holography, which has broad prospects in dynamic display and information encryption.

Figure 1:
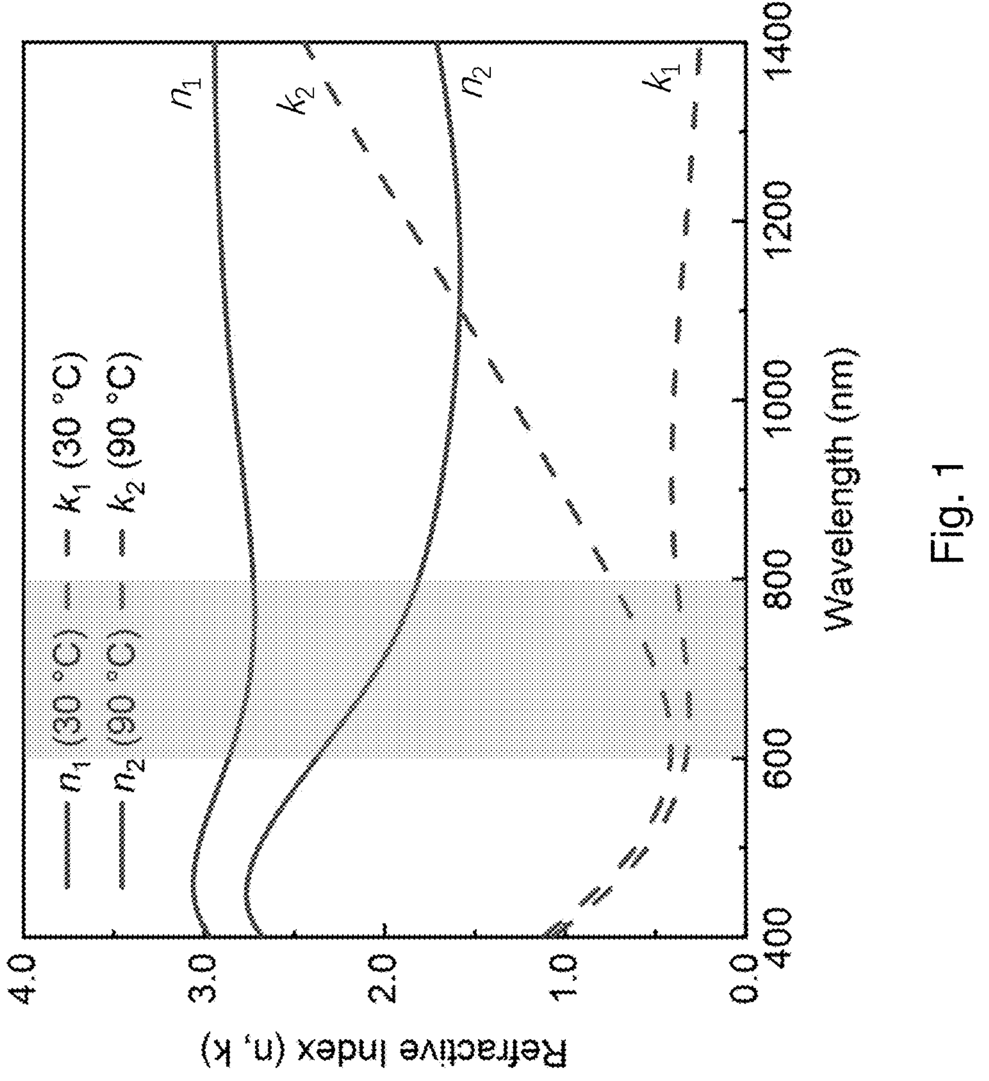
FIG. 1 is a graph showing real part (n) and imaginary part (k) of the complex refractive index of $VO_2$ as a function of wavelengths and temperatures. The shaded area indicates the wavelength range of interest, where $|n_1-n_2|$ is relatively large and $k_1$ and $k_2$ are close to zero.

According to an embodiment of the invention, vanadium dioxide ($VO_2$) is chosen as the PCM. $VO_2$, a volatile temperature-sensitive PCM, has been demonstrated to exhibit reversible insulator-to-metal phase transition around 68° C. with significant changes in optical properties [34], leading to various applications of $VO_2$ metasurfaces in color generation [35], polarization control [36, 37], perfect absorption [38], etc. $VO_2$ exhibits reversible insulator-to-metal phase transition around 68° C. with significant changes in its refractive index across the visible and infrared spectrum (FIG. 1). FIG. 1 shows real part (n) and imaginary part (k) of the complex refractive index of $VO_2$ as a function of wavelengths and temperatures. The shaded area indicates the wavelength range of interest, where $|n_1-n_2|$ is relatively large and $k_1$ and $k_2$ are close to zero. To build a tunable holographic metasurface containing two independent binary-phase (0, π) profiles, four types of constituent nano-blocks with distinctive phase differences (0 to 0, 0 to π, π to 0, and π to π) and high cross-polarized light transmittance should be selected from a $VO_2$ meta-atom library. Here, the high cross-polarized light transmittance may refer to the cross-polarized light transmittance of 5% or more. In the full-wave finite-element-method simulations for building such a meta-atom library, periodic $VO_2$ nano-blocks with a fixed period (P=400 nm) and height (H=600 nm) and varying widths and lengths (W, L from 50 nm to 350 nm) are illuminated by circularly polarized light at 30° C. (room temperature, RT) and 90° C. (high temperature, HT), respectively. The incident wavelength ranges from 600 nm and to 800 nm, where $VO_2$ has sufficiently large refractive index differences between RT and HT and relatively low extinction coefficients.

$VO_2$ nano-blocks are patterned to realize a thermally tunable transmissive holographic metasurface working at 620 nm, where the refractive index difference between 30° C. and 90° C. allows sufficient change in propagation phase, and the extinction coefficients remain low (FIG. 1). A gradient descent-based iterative approach is developed to calculate two binary-phase (0, π) holograms separately, which are then encoded into the two different phases of the $VO_2$ metasurface. The nano-blocks are elaborately optimized in morphology to fulfill all possible state transitions, i.e., 0 to 0, 0 to π, π to 0, and π to π, under thermal regulation. The proposed design approach can be promisingly adopted in a broad range of tunable device designs, such as optical data processors, LiDAR, anti-counterfeit packaging, etc.

Method

Design of Nano-Blocks

Figure 2B:
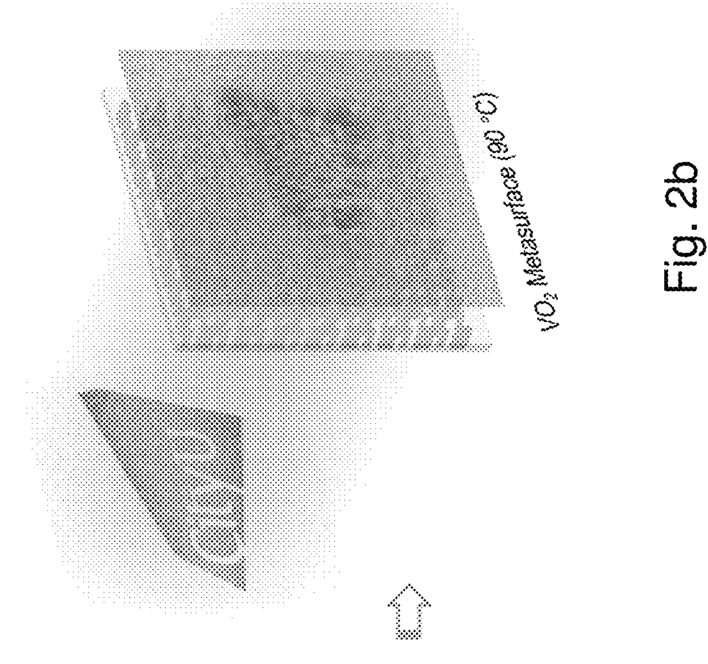
FIGS. 2*a* and 2*b* show schematic diagrams of a thermally tunable $VO_2$ metasurface holography.
Figure 2A:
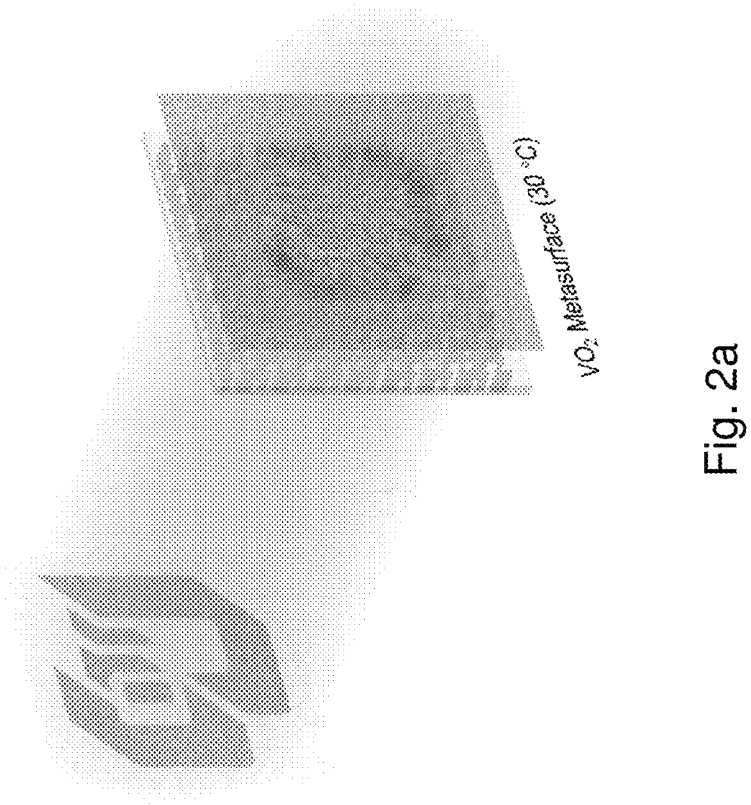

The functionality of the thermally tunable $VO_2$ metasurface is illustrated in FIGS. 2*a* and 2*b*: The older CityU logo appears when the metasurface is optically excited at room temperature (RT, 30° C.), while when it operates at high temperature (HT, 90° C.), the latest CityU logo is displayed. To build such a tunable holographic metasurface containing two independent binary-phase (0, π) profiles, four sets of constituent nano-blocks should be specially engineered to fulfill the four possible state transitions, i.e., 0 to 0, 0 to π, π to 0, and π to π. Taking the amplitude into consideration, there is a combination of 10 parameters ($T_{RT}(i)$, $\varphi_{RT}(i)$, $T_{HT}(i)$, $\varphi_{HT}(i)$, $\varphi_{RT}(i)-\varphi_{RT}(j)$, $\varphi_{HT}(i)-\varphi_{HT}(j)$) to investigate for one single nano-block, where $T_{R(H)T}$ and $P_{R(H)T}$ are the transmittance and phase shift of cross-polarized light at R(H)T, respectively, and i, j=1, 2, 3, or 4 (i<j). This will be further described with reference to Tables 2 and 3 and the relevant discussion below.

Figure 3:
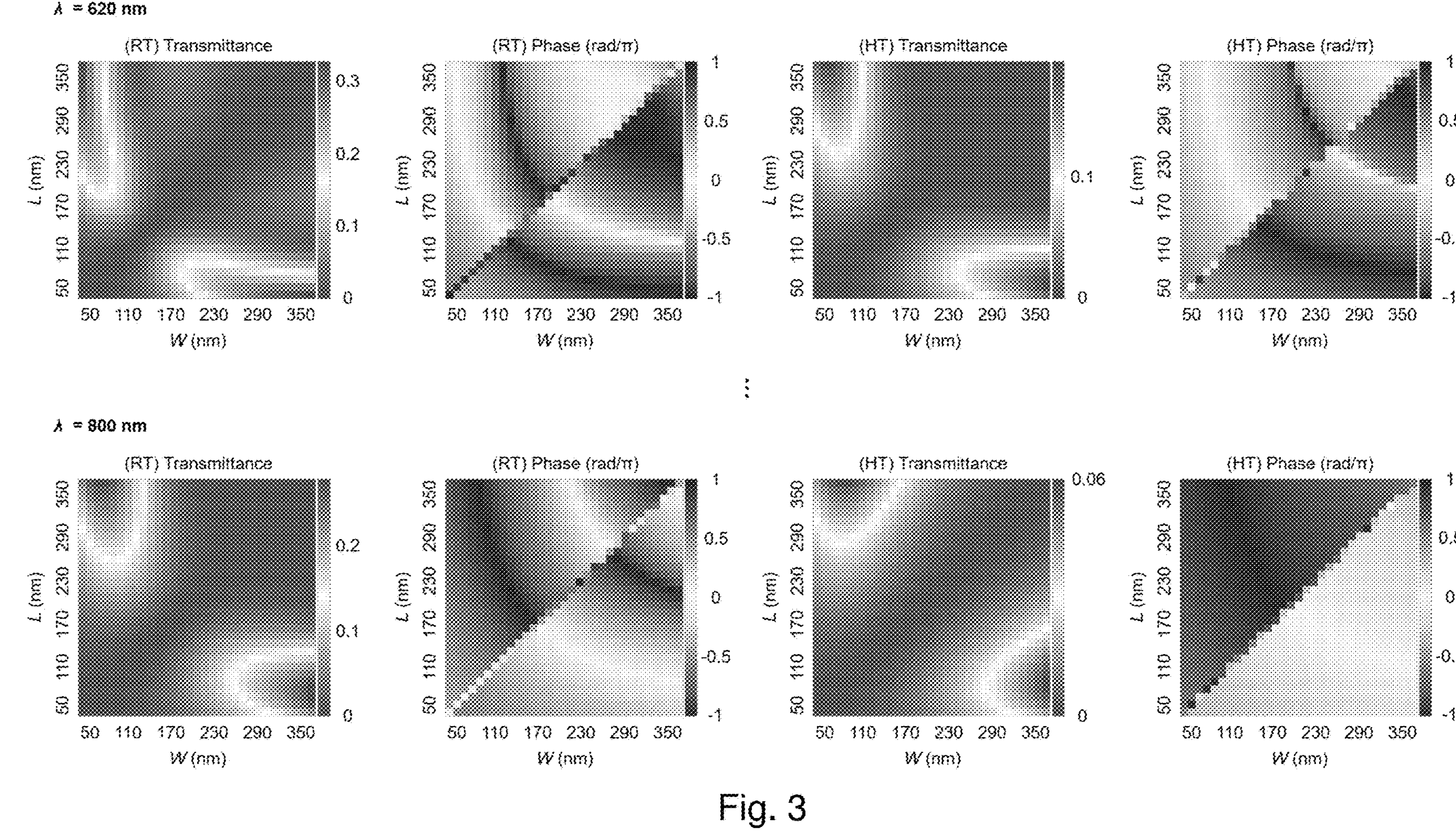
FIG. 3 shows an example meta-atom library (taking $\lambda$=620 nm and 800 nm as an example): the cross-polarized light transmittance and phase shift at RT and HT as a function of W and L.

For this purpose, a $VO_2$ meta-atom library is constructed, from which four sets of nano-blocks with distinctive phase differences and high cross-polarized light transmittance can be selected. Full-wave finite-element-method simulations are performed with COMSOL Multiphysics 5.5, where periodic $VO_2$ nano-blocks with a fixed period (P=400 nm) and height (H=600 nm) and varying widths and lengths (W, L from 50 nm to 350 nm) are illuminated by circularly polarized light at 30° C. and 90° C., respectively. The incident wavelength ranges from 600 nm to 800 nm, where $VO_2$ has sufficiently large refractive index differences between RT and HT and relatively low extinction coefficients [34]. The structure-dependent transmittance and phase shift of nano-blocks at 620 nm and 800 nm are shown as an example in FIG. 3.

Figure 4:
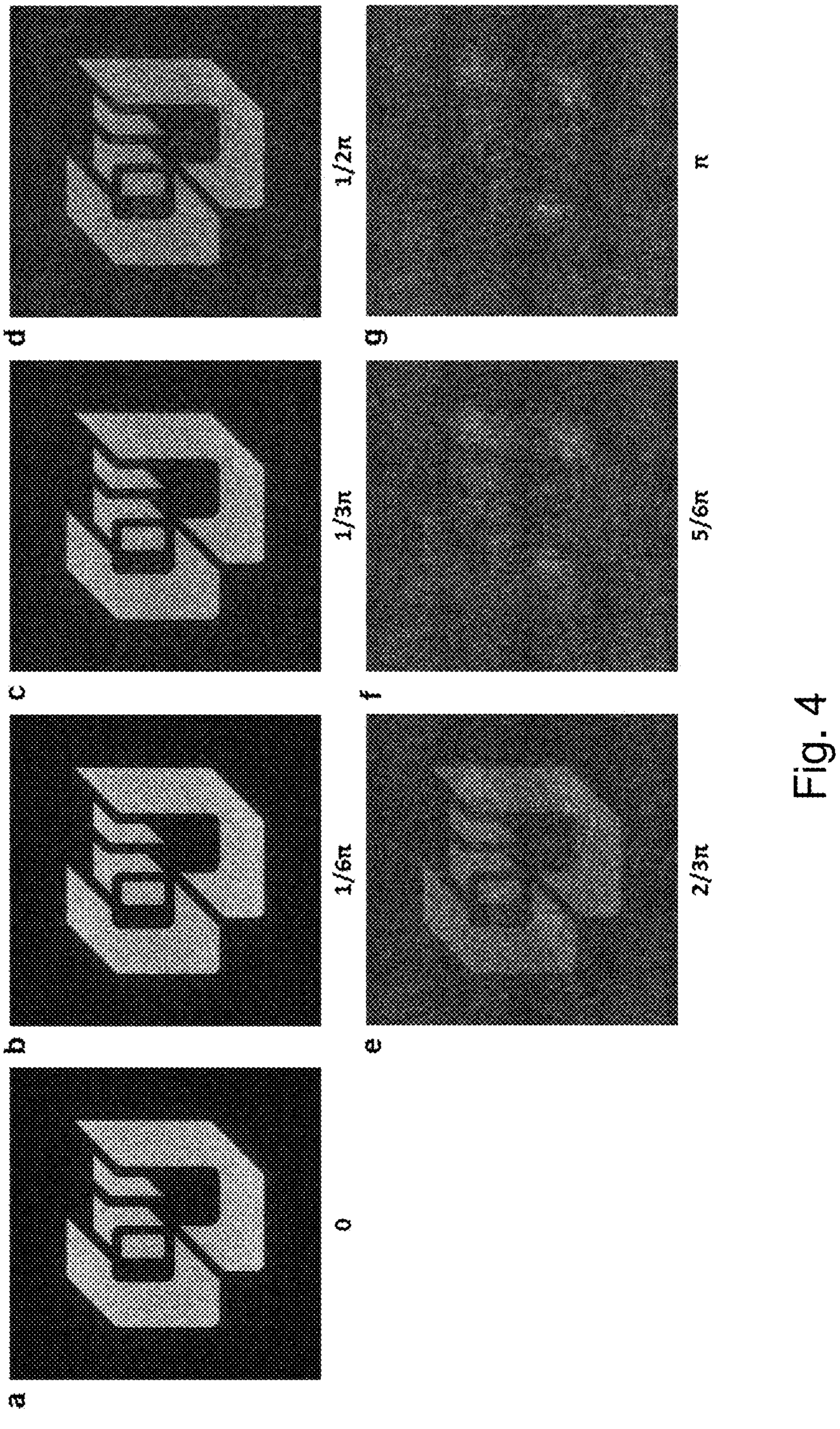
FIG. 4 shows holographic images with varying phase imprecision $\Delta\varphi$ from 0 to $\pi$. Peak signal-to-noise ratios (PSNRs) of the images, 11.53 dB (a), 11.06 dB (b), 9.86 dB (c), 8.43 dB (d), 7.22 dB (e), 6.44 dB (f), and 6.18 dB (g).
Figure 5:
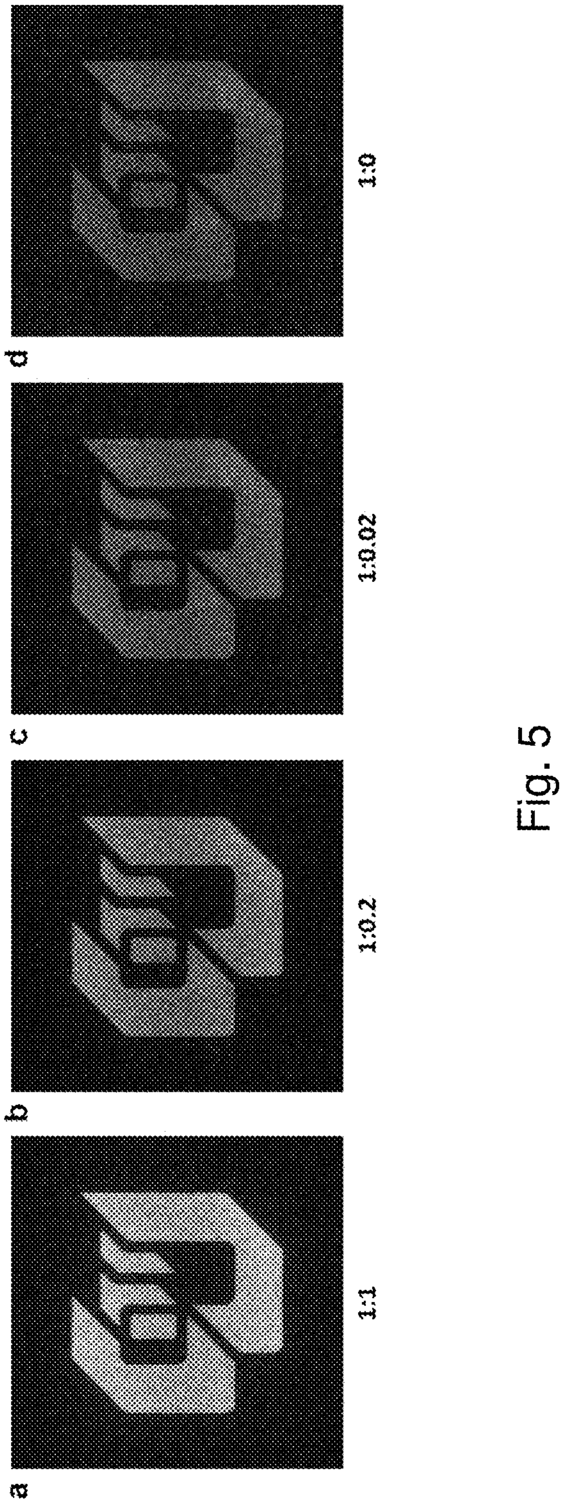
FIG. 5 shows holographic images with varying transmittance differences from 1:1 to 1:0. PSNRs of the images, 11.53 dB (a), 9.51 dB (b), 8.40 dB (c), and 7.99 dB (d). One can see that transmittance differences have a lower impact on image quality than phase imprecision.
Figure 6B:
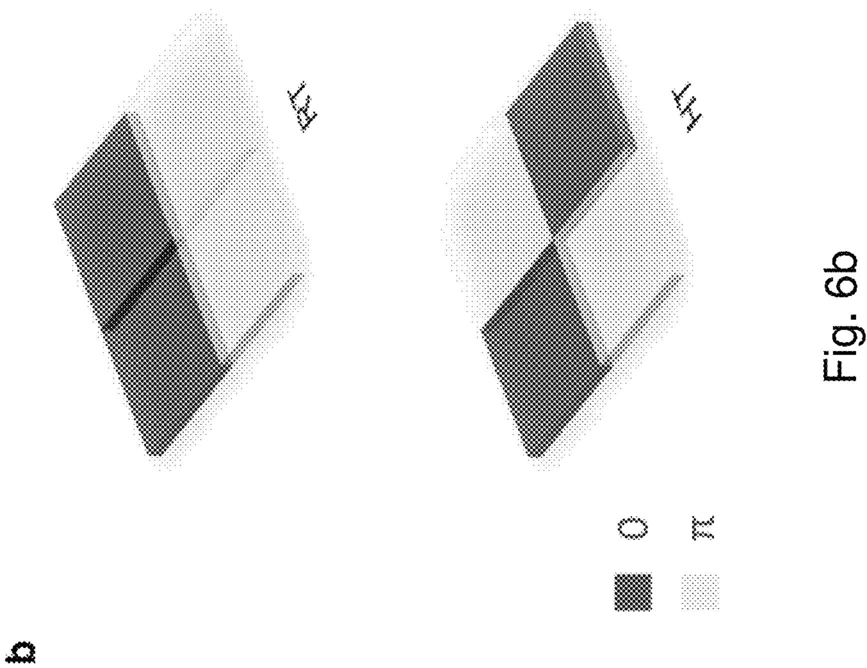
FIG. 6*b* shows their states at RT and HT.
Figure 6A:
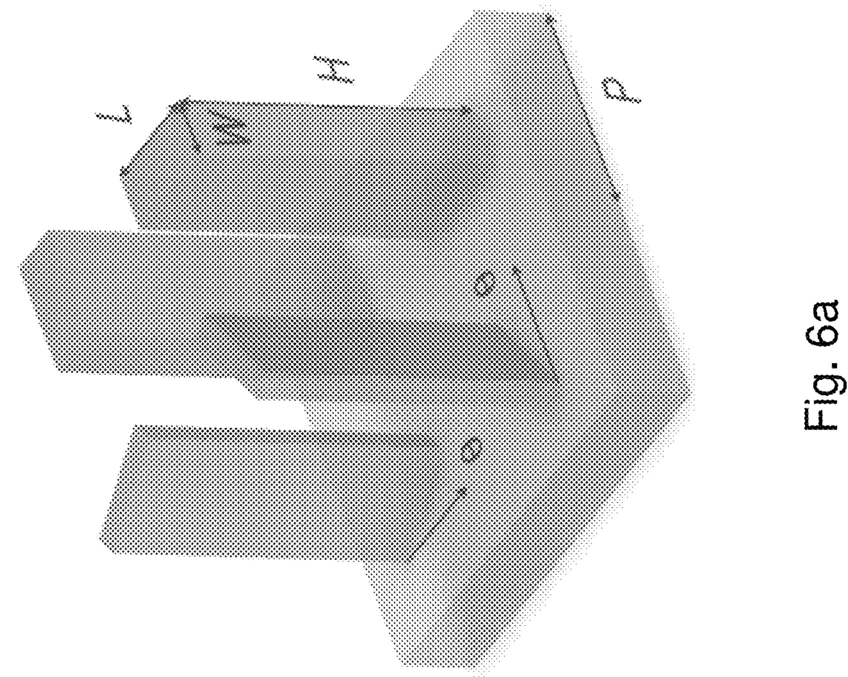
FIG. 6*a* shows example building blocks of the four nano-blocks according to an embodiment of the invention.

Based on the simulation results, it is found that the nano-blocks with high conversion efficiency always exhibit limited phase shift changes between RT and HT. This indicates an unavoidable trade-off between high transmittance and high precision in phase differences. Further study of imprecision in phase difference and transmittance imbalance reveals that the former has a greater impact on holographic images than the latter (FIGS. 4 and 5). On the other hand, it is well known that the Pancharatnam-Berry (PB) phase of a rotated nano-block $\varphi_{PB}=\pm 2\theta$ changes in sign with the reversal of incident light's chirality [39]. Therefore, the phase imprecision $\Delta\varphi$ can be compensated by rotating the orientation of the nano-blocks by $\theta=|0.5\Delta\varphi|$ and reversing the circularity of incident light at HT, if the phase shift of nano-blocks without rotation remains constant in value while changes its sign when transitioning from RT to HT. The optical properties and the schematic of the building blocks of the four selected nano-blocks are shown in Table 1 and FIGS. 6*a* and 6*b*, respectively. FIG. 6*a* shows building blocks of the four nano-blocks, and FIG. 6*b* shows their states at RT and HT.

TABLE 1

Selected nano-blocks with the required phase differences and high cross-polarized light transmittance. T, transmittance; φ, phase shift; and ±2θ, additional PB phase. In our case, $\Delta\varphi = \pm 0.35\pi$, $\theta = 0.175\pi$, "−2θ" at RT and "+2θ" at HT for illumination with the proper chirality, and "+2θ" at RT and "−2θ" at HT for the opposite chirality.
λ = 620 nm

| W (nm) | L (nm) | $T_{RT}$ (%) | $\varphi_{RT}$ (rad) | $T_{HT}$ (%) | $\varphi_{HT}$ (rad) | Type |
|---|---|---|---|---|---|---|
| 50 | 220 | 19.6 | 0.35π (∓2θ) | 5.9 | −0.35π (±2θ) | 0 ↔ 0 |
| 220 | 110 | 10.2 | 0 | 6.1 | π | 0 ↔ π |
| 220 | 50 | 19.6 | 1.35π (∓2θ) | 5.9 | 0.65π (±2θ) | π ↔ π |
| 110 | 220 | 10.2 | π | 6.1 | 0 | π ↔ 0 |

The method of selecting nano-blocks with required phase differences and high cross-polarized light transmittance from the $VO_2$ meta-atom library is shown in Table 2, which follows two steps: 1) Select all nano-blocks with cross-polarized light transmittance higher than $T_{min}$ and not exceeding $T_{max}$ at an arbitrary wavelength in the range of 600 nm to 800 nm; 2) compare every two nano-blocks selected from step 1, then find the pairs with phase differences between $-\Delta\varphi_{max}$ and $\Delta\varphi_{max}$ at RT and $\pi-\Delta\varphi_{max}$ and $\Delta+\Delta\varphi_{max}$ at HT at a specific wavelength (i.e., one wavelength, in other words, the phase differences should be compared under the same wavelength). After the above process, several pairs of nano-blocks satisfying the state transitions of 0 to 0 and 0 to π are obtained ("Output of Method" in Table 3). To minimize the impact of the imperfections in phase differences and transmittance, $|\varphi_{HT}(i)-\varphi_{HT}(j)-\pi|=|\varphi_{RT}(i)-\varphi_{RT}(j)|$ (=2θ), $T_{RT}(i)\approx T_{RT}(j)$, and $T_{HT}(i)\approx T_{HT}(j)$ are prioritized in determining the optimal pair. Finally, exchanging the nanoblock's length and width of the selected pair of nano-blocks obtains another pair satisfying π to π and π to 0 state transitions, which complies with the principle of geometric phase ("Final result" in Table 3). The output of the Method with $T_{min}$=0.059, $T_{max}$=0.215, and $\Delta\varphi_{max}$=0.35 (rad/π) and the final result are listed in Table 3.

TABLE 2

Method of selecting nano-blocks from the meta-atom library.
Method: Selecting nano-blocks from the meta-atom library

```
Input: MAL (λ, W, L, T_RT, φ_RT, T_HT, φ_HT) - Meta-atom library;
    T_min - Allowed minimum of transmittance;
    T_max - Allowed maximum of transmittance;
    Δφ_max - Allowed maximum error in phase differences (rad/T).
Initialization: n - Number of wavelengths × number of nano-blocks;
        Set temp to empty list;
        Set result to empty list.
Output: Pairs of nano-blocks with required phase differences and
transmittance.
for i = 1 : 1 : n
  if (T_RT (i) ≥ T_min) and (T_RT (i) ≤ T_max) and (T_HT (i) ≥ T_min) and
   (T_HT (i) ≤ T_max)
then
    temp = [temp; MAL (i)]
   end if
end for
for j = 1 : 1 : size (temp,1)
   for k = i + 1 : 1 : size (temp,1)
     if (λ (j) = λ (k)) and ((|φ_RT (j) − φ_RT (k)| ≤ Δφ_max) or (|φ_RT (j) −
φ_RT (k)| ≥ 2 − Δφ_max))
      and ((|φ_HT(j) − φ_HT (k)| ≤ 1+ Δφ_max) and (|φ_HT (j) − φ_HT (k)| ≥
      1 − Δφ_max)) then
      result = [result, temp (j), temp (k)]
     end if
   end for
end for
return result
```

TABLE 3

Pairs of nano-blocks selected by Method with $T_{min}$ = 0.059, $T_{max}$ = 0.215, and $\Delta\varphi_{max}$ = 0.35 (rad/π) and the final result. Two phase values of 0.59 and −0.02 are added to the phase of the selected nano-blocks at RT and HT, respectively, as the anormal refraction dictated by the generalized Snell's law is determined by phase gradients rather than absolute phase values.

Output of Method:

| λ (nm) | W (nm) | L (nm) | $T_{RT}$ (%) | $\varphi_{RT}$ (rad/π) | $T_{HT}$ (%) | $\varphi_{HT}$ (rad/π) | Type | |
|---|---|---|---|---|---|---|---|---|
| 620 | 50 | 220 | 19.6 | −0.24 | 5.9 | −0.33 | 0 ↔ 0 | |
| 620 | 220 | 110 | 10.2 | −0.59 | 6.1 | −0.98 | 0 ↔ π | |
| 630 | 70 | 210 | 20.5 | −0.17 | 6.0 | −0.32 | 0 ↔ 0 | |
| 630 | 250 | 120 | 6.6 | −0.47 | 5.9 | −0.97 | 0 ↔ π | |
| 640 | 70 | 220 | 21.2 | −0.24 | 6.0 | −0.38 | 0 ↔ 0 | Not selected |
| 640 | 260 | 120 | 7.3 | −0.57 | 6.1 | 0.94 | 0 ↔ π | |

TABLE 3-continued

Pairs of nano-blocks selected by Method with $T_{min}$ = 0.059, $T_{max}$ = 0.215, and $\Delta\varphi_{max}$ = 0.35 (rad/π) and the final result. Two phase values of 0.59 and −0.02 are added to the phase of the selected nano-blocks at RT and HT, respectively, as the anormal refraction dictated by the generalized Snell's law is determined by phase gradients rather than absolute phase values.

Final result:

| λ (nm) | W (nm) | L (nm) | $T_{RT}$ (%) | $\varphi_{RT}$ + 0.59 (rad/π) | $T_{HT}$ (%) | $\varphi_{HT}$ − 0.02 (rad/π) | Type |
|---|---|---|---|---|---|---|---|
| 620 | 50 | 220 | 19.6 | 0.35 | 5.9 | −0.35 | 0 ↔ 0 |
| 620 | 220 | 110 | 10.2 | 0 | 6.1 | 1 | 0 ↔ π |
| 620 | 220 | 50 | 19.6 | 1.35 | 5.9 | 0.65 | π ↔ π * |
| 620 | 110 | 220 | 10.2 | 1 | 6.1 | 0 | π ↔ 0 |

* The phase shift changes by π when W and L are exchanged.

Calculation of Binary-Phase Holograms

Figures 7A, 7B:
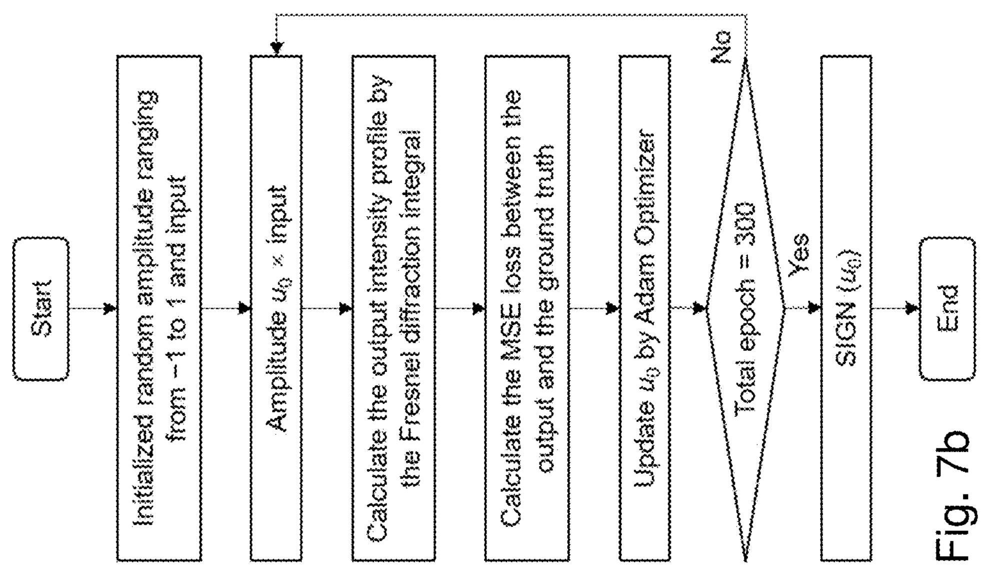
FIG. 7*a* shows an example structure of a machine learning model for hologram calculation according to an embodiment of the invention.
FIG. 7*b* shows an example flowchart of the machine learning model.

Images from binary holograms usually suffer from poor quality due to binarization. Here, the binary-phase holograms with 0 and π phases are calculated by a gradient descent-based iterative approach. FIGS. 7*a* and 7*b* show the structure (FIG. 7*a*) and flowchart (FIG. 7*b*) of the machine learning model (i.e., the gradient descent-based iterative approach for hologram calculation) are shown in FIGS. 7*a* and 7*b*. SIGN is the sign function in FIG. 7*b*. The model consists of three layers with the size 1000×1000: an input layer, a hidden layer, and an output layer, corresponding to an incident light, a diffraction plane, and an image plane, respectively. An all-ones matrix representing plane waves serves as the input. Initialized random complex amplitude (real numbers in the range of −1 to 1, where "−" represents a π phase delay) is updated by Adam Optimizer (a conventional stochastic gradient descent optimization algorithm) with a learning rate 0.01 combined with the mean squared error (MSE) loss function. The forward propagation is based on the Fresnel diffraction theory $$I(x, y) = \left|F^{-1}\{F\{u_0(x_0, y_0)\} \times H(f_x, f_y)\}\right|^2, \tag{1a}$$

$$H(f_x, f_y) = e^{ikz\left[1-\frac{\lambda^2}{2}(f_x^2+f_y^2)\right]}, \tag{1b}$$

where F and $F^{-1}$ represent the Fourier transform and inverse Fourier transform, respectively; x, y, and z are the spatial coordinates; $x_0$ and $y_0$ are the spatial coordinates in the diffraction plane; $f_x$ and $f_y$ are the spatial frequencies; and $u_0$, I, H, λ, and k=2π/λ are the complex amplitude of the source field, intensity of the diffraction field at z, transfer function of Fresnel diffraction, wavelength, and wavenumber respectively. The MSE loss value evaluating the difference between the output and the target image converges to 0 after 250 epochs of training. The resultant binary phase profile is taken from the complex amplitude obtained in the last epoch by the sign function. Instead of binarizing the retrieved phase during each iterative process in the GS algorithm [24], the phase profiles in the iterative process are always binary, resulting in less loss of quality.

Results

Figures 8A, 8B, 8C, 8D, 8E, 8F, 8G, 8H, 8I, 8J:
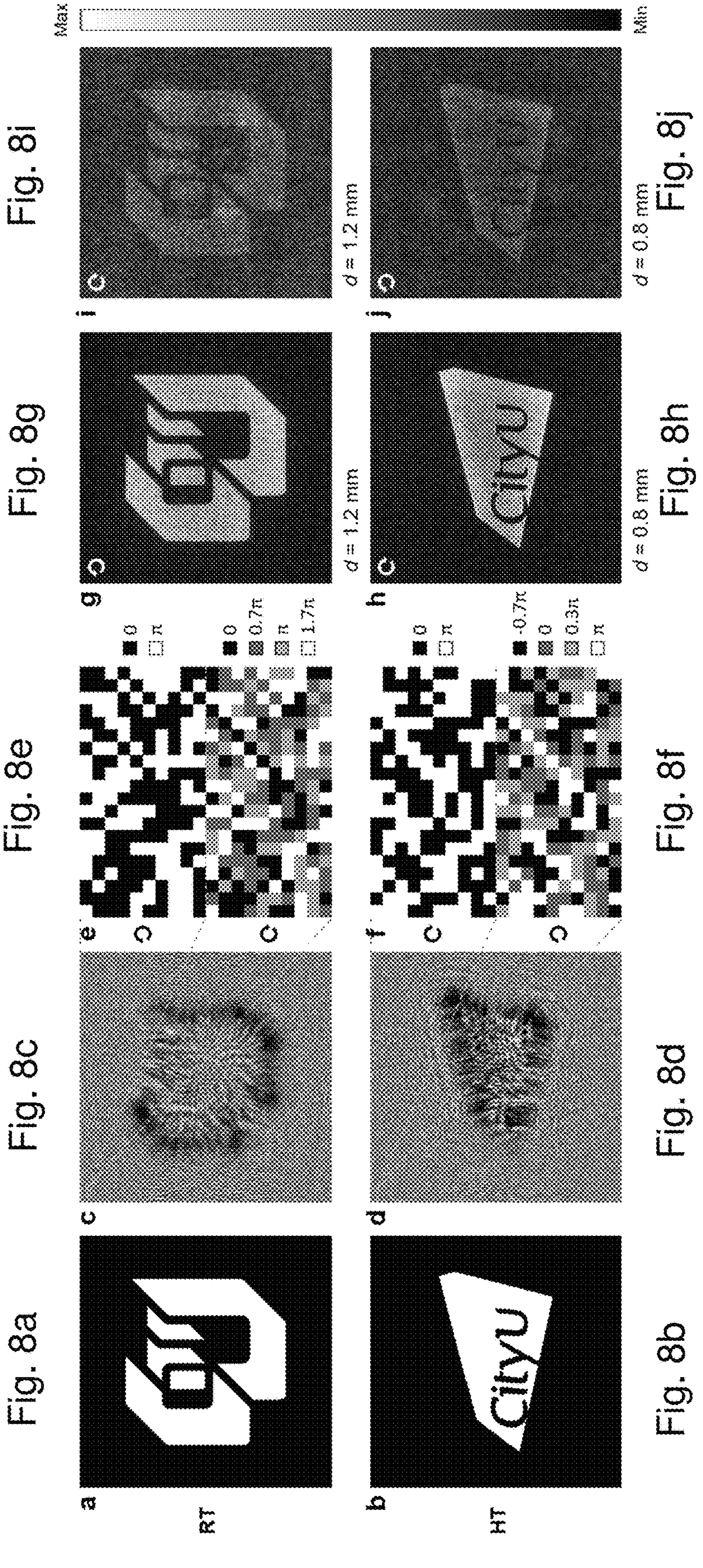
FIGS. 8*a* and 8*b* show binary images of the older version and the latest version of the CityU logo, respectively.
FIGS. 8*c* and 8*d* present the phase profiles of the holograms at RT and HT, respectively.
FIGS. 8*e* and 8*f* show details of the phase profiles under the illumination with proper chirality (top panels) and opposite chirality (bottom panels).
FIGS. 8*g*-8*j* show holographic images under differently chiral illumination with PSNRs=11.38 dB (8*g*), 12.16 dB (8*h*), 7.12 dB (8*i*), and 8.29 dB (8*j*). Circle arrows spinning clockwise and counterclockwise represent RCP and LCP illumination, respectively, and d represents observation distance.

The behavior of the phase change $VO_2$ metasurface under different temperature conditions is illustrated in FIGS. 2*a* and 2*b*: Image 1 (the older CityU logo) appears when the metasurface is optically excited at RT as shown in FIG. 2*a*, while when it operates at HT, Image 2 (the latest CityU logo) is displayed as shown in FIG. 2*b*. FIGS. 8*a* and 8*b* show binary images of the older version and the latest version of the CityU logo, respectively. FIGS. 8*c* and 8*d* present the phase profiles of the metasurface hologram with 1000×1000 pixels at RT and HT, respectively. The reconstructed images at 620 nm are displayed in FIGS. 8*g*-8*j*, all of which are calculated by the Fresnel diffraction integral with concrete optical properties of the nano-blocks listed in Table 1. To avoid holographic image crosstalk, different observation distances of 1.2 mm and 0.8 mm are purposely assigned to the holograms at RT and HT, respectively. FIGS. 8*e* and 8*f* show details of the phase profiles under the illumination with proper chirality (top panels) and opposite chirality (bottom panels). Under the illumination with proper chirality (left-handed circular polarization (LCP) at RT and right-handed circular polarization (RCP) at HT), the holograms have the correct binary-phase distribution (top panels of FIGS. 8*e* and 8*f*), and targeted images are reconstructed with sharp edges and high peak signal-to-noise ratios (PSNRs), as shown in FIGS. 8*g* and 8*h*. FIGS. 8*g* to 8*j* show holographic images under differently chiral illumination with PSNRs=11.38 dB (FIG. 8*g*), 12.16 dB (FIG. 8*h*), 7.12 dB (FIG. 8*i*), and 8.29 dB (FIG. 8*j*). Here, circle arrows spinning clockwise and counterclockwise represent RCP and LCP illumination, respectively, and d represents observation distance. It should be noted that the larger transmittance imbalance between nano-blocks at RT results in the brighter background of FIG. 8*g* as compared to FIG. 8*h*. On the contrary, incident waves with opposite handedness double the phase imprecision Δφ (as revealed by the bottom panels in FIGS. 8*e* and 8*f*), thus reconstructing images with lower PSNRs and intensity (FIGS. 8*i* and 8*j*). As a consequence, all the parameters for generating the holographic images, including the wavelength, polarization, observation distance, and temperature, can be regarded as multiple "keys" for information encryption and decryption.

CONCLUSION

The quality of holographic images generated by spatial light modulators (SLMs) can be degraded due to modulation errors, high-order diffraction, and narrow viewing angles. Metasurfaces are capable of generating high-quality and large-viewing-angle holographic images without unwanted diffraction orders. Recent developments show that PCMs such as germanium antimony tellurium (GST) and $VO_2$ have been studied for their tunability in metasurface holography. For example, in references [42,43], rewriting refractive index profiles on GST films always involves femtosecond laser scanning, making real-time dynamic display difficult to achieve. Reference proposes a metasurface composed by three-level switchable aluminum and GST stacked nano-blocks; however, only one encrypted holographic image is demonstrated. $VO_2$ integrated split-ring resonators in reference are difficult to work in the visible and infrared region due to their large size.

The embodiments of the invention present a general approach to the design of thermally tunable $VO_2$ metasurfaces. The phase transition characteristics of $VO_2$ and the elaborately chosen and rotated nano-blocks enable the phase profile of $VO_2$ metasurfaces to be switchable between two arbitrary binary phase profiles by thermal tuning. As a proof of concept, two binary-phase holograms calculated by a gradient descent-based iterative approach are encoded into the phase profiles of the $VO_2$ metasurface at two temperatures. More degrees of freedom could be further exploited with multi-level phase difference switching. The proposed design approach could also be used with other actively tunable materials, e.g., germanium antimony tellurium, liquid crystals, or graphene. The proposed design can be used for dynamic display, optical processing, LiDAR, and information encryption/decryption.

It will be appreciated by a person skilled in the art that variations and/or modifications may be made to the described and/or illustrated embodiments of the invention to provide other embodiments of the invention. The described/or illustrated embodiments of the invention should therefore be considered in all respects as illustrative, not restrictive. Example optional features of some embodiments of the invention are provided in the summary and the description. Some embodiments of the invention may include one or more of these optional features (some of which are not specifically illustrated in the drawings). Some embodiments of the invention may lack one or more of these optional features (some of which are not specifically illustrated in the drawings). While some embodiments relate to human point clouds, it should be appreciated that methods/framework of the invention can be applied to other point clouds (not limited to human point clouds).

REFERENCES

ADDIN EN.REFLIST [1] P. Hariharan, *Optical Holography: Principles, techniques and applications*: Cambridge University Press, 1996.

[2] D. Pi, J. Liu, and Y. Wang, "Review of computer-generated hologram algorithms for color dynamic holographic three-dimensional display," *Light Sci Appl*, vol. 11, no. 1, pp. 231, Jul. 26, 2022.

[3] T. Shimobaba, D. Blinder, T. Birnbaum, I. Hoshi, H. Shiomi, P. Schelkens, and T. Ito, "Deep-Learning Computational Holography: A Review," *Frontiers in Photonics*, vol. 3, 2022.

[4]R. W. Gerchberg, "A practical algorithm for the determination of plane from image and diffraction pictures," *Optik*, vol. 35, no. 2, pp. 237-246, 1972.

[5]M. Makowski, "Three-plane phase-only computer hologram generated with iterative Fresnel algorithm," *Optical Engineering*, vol. 44, no. 12, 2005.

[6]T. Zhao, and Y. Chi, "Modified Gerchberg-Saxton (G-S) Algorithm and Its Application," *Entropy* (*Basel*), vol. 22, no. 12, Nov. 30, 2020.

[7]Z. Jin, S. Mei, S. Chen, Y. Li, C. Zhang, Y. He, X. Yu, C. Yu, J. K. W. Yang, B. Luk'yanchuk, S. Xiao, and C. W. Qiu, "Complex Inverse Design of Meta-optics by Segmented Hierarchical Evolutionary Algorithm," *ACS Nano*, vol. 13, no. 1, pp. 821-829, Jan. 22, 2019.

[8]H. Goi, K. Komuro, and T. Nomura, "Deep-learning-based binary hologram," *Appl Opt*, vol. 59, no. 23, pp. 7103-7108, Aug. 10, 2020.

[9]D. Liao, M. Wang, K. F. Chan, C. H. Chan, and H. Wang, "A Deep-Learning Enabled Discrete Dielectric Lens Antenna for Terahertz Reconfigurable Holographic Imaging," *IEEE Antennas and Wireless Propagation Letters*, vol. 21, no. 4, pp. 823-827, 2022.

[10]H. Zhou, X. Li, H. Wang, S. Zhang, Z. Su, Q. Jiang, N. Ullah, X. Li, Y. Wang, and L. Huang, "Ultra-dense moving cascaded metasurface holography by using a physics-driven neural network," *Opt Express*, vol. 30, no. 14, pp. 24285-24294, Jul. 4, 2022.

[11]N. Yu, P. Genevet, M. A. Kats, F. Aieta, J. P. Tetienne, F. Capasso, and Z. Gaburro, "Light propagation with phase discontinuities: generalized laws of reflection and refraction," *Science*, vol. 334, no. 6054, pp. 333-7, Oct. 21, 2011.

[12]D. Lin, P. Fan, E. Hasman, and M. L. Brongersma, "Dielectric gradient metasurface optical elements," *Science*, vol. 345, no. 6194, pp. 298-302, Jul. 18, 2014.

[13]M. Khorasaninejad, W. T. Chen, R. C. Devlin, J. Oh, A. Y. Zhu, and F. Capasso, "Metalenses at visible wavelengths: Diffraction-limited focusing and subwavelength resolution imaging," *Science*, vol. 352, no. 6290, pp. 1190-4, Jun. 3, 2016.

[14]×. Ni, A. V. Kildishev, and V. M. Shalaev, "Metasurface holograms for visible light," *Nature Communications*, vol. 4, no. 1, 2013.

[15]L. Huang, X. Chen, H. Mühlenbernd, H. Zhang, S. Chen, B. Bai, Q. Tan, G. Jin, K.-W. Cheah, C.-W. Qiu, J. Li, T. Zentgraf, and S. Zhang, "Three-dimensional optical holography using a plasmonic metasurface," *Nature Communications*, vol. 4, no. 1, 2013.

[16]D. Wen, F. Yue, G. Li, G. Zheng, K. Chan, S. Chen, M. Chen, K. F. Li, P. W. Wong, K. W. Cheah, E. Y. Pun, S. Zhang, and X. Chen, "Helicity multiplexed broadband metasurface holograms," *Nat Commun*, vol. 6, pp. 8241, Sep. 10, 2015.

[17]B. Wang, F. Dong, Q. T. Li, D. Yang, C. Sun, J. Chen, Z. Song, L. Xu, W. Chu, Y. F. Xiao, Q. Gong, and Y. Li, "Visible-Frequency Dielectric Metasurfaces for Multi-wavelength Achromatic and Highly Dispersive Holograms," *Nano Lett*, vol. 16, no. 8, pp. 5235-40, Aug. 10, 2016.

[18]L. Huang, S. Zhang, and T. Zentgraf, "Metasurface holography: from fundamentals to applications," *Nanophotonics*, vol. 7, no. 6, pp. 1169-1190, 2018.

[19]R. Zhao, L. Huang, and Y. Wang, "Recent advances in multi-dimensional metasurfaces holographic technologies," *PhotoniX*, vol. 1, no. 1, 2020.

[20]H. S. Ee, and R. Agarwal, "Tunable Metasurface and Flat Optical Zoom Lens on a Stretchable Substrate," *Nano Lett*, vol. 16, no. 4, pp. 2818-23, Apr. 13, 2016.

[21]P. Gutruf, C. Zou, W. Withayachumnankul, M. Bhaskaran, S. Sriram, and C. Fumeaux, "Mechanically Tunable Dielectric Resonator Metasurfaces at Visible Frequencies," *ACS Nano*, vol. 10, no. 1, pp. 133-41, Jan. 26, 2016.

[22]S. C. Malek, H. S. Ee, and R. Agarwal, "Strain Multiplexed Metasurface Holograms on a Stretchable Substrate," *Nano Lett*, vol. 17, no. 6, pp. 3641-3645, Jun. 14, 2017.

[23]J. Li, S. Kamin, G. Zheng, F. Neubrech, S. Zhang, and N. Liu, "Addressable metasurfaces for dynamic holography and optical information encryption," *Sci Adv*, vol. 4, no. 6, pp. eaar6768, June, 2018.

[24]L. Li, T. Jun Cui, W. Ji, S. Liu, J. Ding, X. Wan, Y. Bo Li, M. Jiang, C. W. Qiu, and S. Zhang, "Electromagnetic reprogrammable coding-metasurface holograms," *Nat Commun*, vol. 8, no. 1, pp. 197, Aug. 4, 2017.

[25]R. Feng, B. Ratni, J. Yi, K. Zhang, X. Ding, H. Zhang, A. de Lustrac, and S. N. Burokur, "Versatile Airy-Beam Generation Using a 1-Bit Coding Programmable Reflective Metasurface," *Physical Review Applied, vol.* 14, no. 1, 2020.

[26]R. Feng, B. Ratni, J. Yi, H. Zhang, A. de Lustrac, and S. N. Burokur, "Versatile metasurface platform for electromagnetic wave tailoring," *Photonics Research*, vol. 9, no. 9, 2021.

[27]G.-B. Wu, J. Y. Dai, Q. Cheng, T. J. Cui, and C. H. Chan, "Sideband-free space-time-coding metasurface antennas," *Nature Electronics*, vol. 5, no. 11, pp. 808-819, 2022.

[28]I. Kim, J. Jang, G. Kim, J. Lee, T. Badloe, J. Mun, and J. Rho, "Pixelated bifunctional metasurface-driven dynamic vectorial holographic color prints for photonic security platform," *Nat Commun*, vol. 12, no. 1, pp. 3614, Jun. 14, 2021.

[29]Q. Wang, E. T. F. Rogers, B. Gholipour, C.-M. Wang, G. Yuan, J. Teng, and N. I. Zheludev, "Optically reconfigurable metasurfaces and photonic devices based on phase change materials," *Nature Photonics*, vol. 10, no. 1, pp. 60-65, 2015.

[30]×. Liu, Q. Wang, X. Zhang, H. Li, Q. Xu, Y. Xu, X. Chen, S. Li, M. Liu, Z. Tian, C. Zhang, C. Zou, J. Han, and W. Zhang, "Thermally Dependent Dynamic Meta-Holography Using a Vanadium Dioxide Integrated Metasurface," *Advanced Optical Materials*, vol. 7, no. 12, 2019.

[31]C. Choi, S. E. Mun, J. Sung, K. Choi, S. Y. Lee, and B. Lee, "Hybrid State Engineering of Phase-Change Metasurface for All-Optical Cryptography," *Advanced Functional Materials*, vol. 31, no. 4, 2020.

[32]F. Zhang, X. Xie, M. Pu, Y. Guo, X. Ma, X. Li, J. Luo, Q. He, H. Yu, and X. Luo, "Multistate Switching of Photonic Angular Momentum Coupling in Phase-Change Metadevices," *Adv Mater*, vol. 32, no. 39, pp. e1908194, October, 2020.

[33]C. Wu, H. Yu, S. Lee, R. Peng, I. Takeuchi, and M. Li, "Programmable phase-change metasurfaces on waveguides for multimode photonic convolutional neural network," *Nat Commun*, vol. 12, no. 1, pp. 96, Jan. 4, 2021.

[34]P. Kepič, F. Ligmajer, M. Hrtoň, H. Ren, L. d. S. Menezes, S. A. Maier, and T. Šikola, "Optically Tunable Mie Resonance VO2 Nanoantennas for Metasurfaces in the Visible," *ACS Photonics*, vol. 8, no. 4, pp. 1048-1057, 2021.

[35]F. Z. Shu, F. F. Yu, R. W. Peng, Y. Y. Zhu, B. Xiong, R. H. Fan, Z. H. Wang, Y. Liu, and M. Wang, "Dynamic Plasmonic Color Generation Based on Phase Transition of Vanadium Dioxide," *Advanced Optical Materials*, vol. 6, no. 7, 2018.

[36]Z.-Y. Jia, F.-Z. Shu, Y.-J. Gao, F. Cheng, R.-W. Peng, R.-H. Fan, Y. Liu, and M. Wang, "Dynamically Switching the Polarization State of Light Based on the Phase Transition of Vanadium Dioxide," *Physical Review* Applied, vol. 9, no. 3, 2018.

[37]F. Z. Shu, J. N. Wang, R. W. Peng, B. Xiong, R. H. Fan, Y. J. Gao, Y. Liu, D. X. Qi, and M. Wang, "Electrically Driven Tunable Broadband Polarization States via Active Metasurfaces Based on Joule-Heat-Induced Phase Transition of Vanadium Dioxide," *Laser & Photonics Reviews*, vol. 15, no. 10, 2021.

[38]J. N. Wang, B. Xiong, R. W. Peng, C. Y. Li, B. Q. Hou, C. W. Chen, Y. Liu, and M. Wang, "Flexible Phase Change Materials for Electrically-Tuned Active Absorbers," *Small*, vol. 17, no. 31, pp. e2101282, August, 2021.

[39]M. Kang, T. Feng, H. T. Wang, and J. Li, "Wave front engineering from an array of thin aperture antennas," *Opt Express*, vol. 20, no. 14, pp. 15882-90, Jul. 2, 2012.

[40]D. P. Kingma, and J. Ba, "Adam: A method for stochastic optimization," *arXiv preprint arXiv:*1412.6980, 2014.

[41]J. W. Goodman, *Introduction to Fourier optics*: Roberts and Company publishers, 2005.

[42] Wang, Qian, et al. "Optically reconfigurable metasurfaces and photonic devices based on phase change materials." Nature photonics 10.1 (2016): 60-65.

[43] Lee, Seung-Yeol, et al. "Holographic image generation with a thin-film resonance caused by chalcogenide phase-change material." Scientific reports 7.1 (2017): 41152.

[44] Choi, Chulsoo, et al. "Hybrid state engineering of phase-change metasurface for all-optical cryptography." Advanced Functional Materials 31.4 (2021): 2007210.

[45] Liu, Xingbo, et al. "Thermally dependent dynamic meta-holography using a vanadium dioxide integrated metasurface." Advanced Optical Materials 7.12 (2019): 1900175.

The invention claimed is:

1. A metasurface structure comprising:

an array of sub-wavelength structures including a phase change material (PCM), encoded with different holographic images based on different phases of the PCM, the different phases including a first phase and a second phase, wherein phase transition between the first phase and the second phase occurs when the metasurface structure is thermally tuned between different temperatures, and wherein each sub-wavelength structure in the array has a distinctive phase difference between the first phase and the second phase of the PCM, and wherein the different holographic images comprise a first holographic image displayed in the first phase at a first temperature and a second holographic image displayed in the second phase at a second temperature.

2. The metasurface structure of claim 1, wherein the phase change material comprises vanadium dioxide ($VO_2$).

3. The metasurface structure of claim 1, wherein the metasurface structure is optically excited by visible radiation.

4. The metasurface structure of claim 3, wherein the visible radiation has a wavelength which ranges between 600 nm to 800 nm.

5. The metasurface structure of claim 1, wherein the array of sub-wavelength structures comprises a plurality of sub-wavelength micro-structures or nano-structures.

6. The metasurface structure of claim 1, wherein the array of sub-wavelength structures is in the form of nano-blocks having a height, a length and a width.

7. The metasurface structure of claim 6, wherein dimensions and/or rotation states of the array of the nano-blocks are optimized based on a meta-atom library.

8. The metasurface structure of claim 7, wherein the array of the nano-blocks comprises four types of nano-blocks which are selected to have distinctive phase differences between two phases of the PCM and high cross-polarized light transmittance.

9. The metasurface structure of claim 8, wherein the four nano-blocks are different in terms of at least one of their rotation states and dimensions.

10. A method for encoding information on a metasurface structure including an array of sub-wavelength structures, comprising:

selecting the array of sub-wavelength structures including a phase change material (PCM) such that each sub-wavelength structure in the array has a distinctive phase difference between a first phase and a second phase of the PCM; and encoding at least two different holographic images into the array of sub-wavelength structures based on the first phase and the second phase of the PCM, wherein the first phase and the second phase are different, and phase transition between the first phase and the second phase occurs when the metasurface structure is thermally tuned between different temperatures, wherein the at least two different holographic images comprise a first holographic image displayed in the first phase at a first temperature and a second holographic image displayed in the second phase at a second temperature.

11. The method of claim 10, wherein selecting the array of sub-wavelength structures comprises:

selecting dimensions and/or rotation states of respective sub-wavelength structures in the array.

12. The method of claim 10, further comprising:

constructing a meta-atom library to show cross-polarized light transmittance and phase shift at different temperatures as a function of dimensions of the array of sub-wavelength structures.

13. The method of claim 12, wherein selecting the array of sub-wavelength structures comprises selecting, from the meta-atom library, four nano-blocks with distinctive phase differences and high cross-polarized light transmittance.

14. The method of claim 10, wherein the array of sub-wavelength structures is in the form of nano-blocks having a height, a length and a width.

15. The method of claim 14, wherein selecting the array of sub-wavelength structures comprises:

selecting all nano-blocks with cross-polarized light transmittance higher than an allowed minimum of transmittance $T_{min}$ and not exceeding an allowed maximum of transmittance $T_{max}$ at an arbitrary wavelength in the range of 600 nm to 800 nm;

comparing every two nano-blocks selected from the previous selecting step, and finding pairs with phase differences between $-\Delta\varphi_{max}$ and $\Delta\varphi_{max}$ at the first temperature and $\pi-\Delta\varphi_{max}$ and $\pi+\Delta\varphi_{max}$ at the second temperature at one wavelength where $\Delta\varphi_{max}$ is an allowed maximum error in phase differences;

obtaining pairs of nano-blocks satisfying the state transitions of 0 to 0 and 0 to $\pi$; and exchanging the nano-block's length and width of the selected pair of nano-blocks to obtain another pair satisfying $\pi$ to $\pi$ and $\pi$ to 0 state transitions.

16. The method of claim 15, wherein the first temperature is a room temperature (RT) and the second temperature is a temperature higher than the room temperature (HT).

17. The method of claim 10, wherein encoding the at least two different holographic images is based on a gradient descent-based iterative approach.

18. The method of claim 17, wherein the gradient descent-based iterative approach is based on a machine learning model comprising three layers of an input layer, a hidden layer, and an output layer, corresponding to an incident light, a diffraction plane, and an image plane, respectively.

19. The method of claim 17, wherein encoding the at least two different holographic images based on the gradient descent-based iterative approach comprises:

calculating two binary-phase holographic images based on the gradient descent-based iterative approach; and encoding the two holographic images into the two different phases of the PCM at the two temperatures including the first temperature and the second temperature.

20. The method of claim 10, wherein encoding the at least two different holographic images comprises applying additional work conditions including wavelength, polarization, and/or observation distance.

21. The method of claim 20, wherein different observation distances and/or different polarizations are assigned for respective holographic images in addition to the different temperatures.

22. The method of claim 10, wherein the phase change material (PCM) comprises vanadium dioxide ($VO_2$).

23. The method of claim 10, wherein the at least two different holographic images are generated when the metasurface structure is optically excited by visible radiation.

* * * * *